United States Patent
Tu et al.

(10) Patent No.: US 7,957,603 B2
(45) Date of Patent: Jun. 7, 2011

(54) DIGITAL IMAGE DECODER WITH INTEGRATED CONCURRENT IMAGE PRESCALER

(75) Inventors: Steven Tu, Phoenix, AZ (US); Joseph G. Warner, Tempe, AZ (US); Dmitrii Loukianov, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1186 days.

(21) Appl. No.: 11/648,714

(22) Filed: Dec. 29, 2006

(65) Prior Publication Data
US 2008/0159654 A1 Jul. 3, 2008

(51) Int. Cl.
*G06K 9/36* (2006.01)
*G09G 5/36* (2006.01)

(52) U.S. Cl. ......... 382/233; 345/545

(58) Field of Classification Search ......... 382/232–253; 345/501–506, 519–520, 530–574, 204
See application file for complete search history.

(56) References Cited

U.S. PATENT DOCUMENTS

| | | | | | |
|---|---|---|---|---|---|
| 5,912,710 | A * | 6/1999 | Fujimoto | | 348/445 |
| 6,996,174 | B2 * | 2/2006 | Campisano et al. | | 375/240.13 |
| 7,116,833 | B2 * | 10/2006 | Brower et al. | | 382/240 |
| 7,369,612 | B2 * | 5/2008 | Tsukagoshi et al. | | 375/240.15 |
| 7,373,650 | B1 * | 5/2008 | Rodriguez et al. | | 725/41 |
| 7,404,001 | B2 * | 7/2008 | Campbell et al. | | 709/231 |
| 7,408,590 | B2 * | 8/2008 | Huang et al. | | 348/581 |
| 7,570,819 | B2 * | 8/2009 | Sung et al. | | 382/232 |
| 7,667,707 | B1 * | 2/2010 | Margulis | | 345/519 |
| 2002/0011998 | A1 * | 1/2002 | Tamura | | 345/204 |
| 2002/0106025 | A1 * | 8/2002 | Tsukagoshi et al. | | 375/240.16 |
| 2003/0002584 | A1 * | 1/2003 | Campisano et al. | | 375/240.21 |
| 2003/0012276 | A1 * | 1/2003 | Zhong et al. | | 375/240.2 |
| 2003/0043298 | A1 * | 3/2003 | Ohtsuki et al. | | 348/584 |
| 2004/0227778 | A1 * | 11/2004 | Lin et al. | | 345/719 |
| 2005/0062755 | A1 * | 3/2005 | Van Dyke et al. | | 345/603 |
| 2005/0097620 | A1 * | 5/2005 | Fye | | 725/118 |
| 2006/0012616 | A1 * | 1/2006 | Paek | | 345/698 |
| 2006/0024023 | A1 * | 2/2006 | Hsu et al. | | 386/66 |
| 2006/0061822 | A1 * | 3/2006 | Sung et al. | | 358/1.16 |
| 2006/0073816 | A1 * | 4/2006 | Kim et al. | | 455/414.1 |
| 2006/0171596 | A1 * | 8/2006 | Sung et al. | | 382/232 |
| 2006/0271999 | A1 * | 11/2006 | Wakako et al. | | 725/135 |
| 2006/0282855 | A1 * | 12/2006 | Margulis | | 725/43 |
| 2007/0124474 | A1 * | 5/2007 | Margulis | | 709/226 |
| 2007/0126936 | A1 * | 6/2007 | Fujihira et al. | | 348/729 |
| 2007/0130608 | A1 * | 6/2007 | Han et al. | | 725/132 |
| 2007/0132712 | A1 * | 6/2007 | Song | | 345/102 |
| 2007/0146485 | A1 * | 6/2007 | Horikoshi | | 348/173 |
| 2007/0186002 | A1 * | 8/2007 | Campbell et al. | | 709/231 |

(Continued)

OTHER PUBLICATIONS

Imagination Technologies, "POWER MBX—Technology Overview", Version 1.5f, May 6, 2009, Copyright 2009 Imagination Technologies Ltd., 17 pages.

*Primary Examiner* — Manav Seth
(74) *Attorney, Agent, or Firm* — Buckley, Maschoff & Talwalkar LLC

(57) ABSTRACT

According to some embodiments, encoded information associated with an image is received at a decoder. The encoded information may be decoded at the decoder to generate full-sized first image pixels representing a full-sized version of the image. Moreover, the full-sized pixels may be scaled at the decoder to generate scaled image pixels representing a scaled version of the image.

15 Claims, 9 Drawing Sheets

U.S. PATENT DOCUMENTS

| | | | |
|---|---|---|---|
| 2007/0188506 A1* | 8/2007 | Hollevoet et al. | 345/530 |
| 2007/0291667 A1* | 12/2007 | Huber et al. | 370/260 |
| 2007/0294263 A1* | 12/2007 | Punj et al. | 707/10 |
| 2007/0296857 A1* | 12/2007 | Lee | 348/452 |
| 2008/0024671 A1* | 1/2008 | Lee | 348/625 |
| 2008/0043090 A1* | 2/2008 | Wiener | 348/14.09 |
| 2008/0051195 A1* | 2/2008 | Hedrick et al. | 463/29 |
| 2008/0068446 A1* | 3/2008 | Barkley et al. | 348/14.07 |
| 2008/0074444 A1* | 3/2008 | Morikawa et al. | 345/660 |
| 2008/0273592 A1* | 11/2008 | Van Der Stok et al. | 375/240.01 |
| 2010/0054706 A1* | 3/2010 | McCrossan et al. | 386/95 |
| 2010/0098392 A1* | 4/2010 | McCrossan et al. | 386/108 |

* cited by examiner

DIGITAL IMAGE DECODER WITH INTEGRATED CONCURRENT IMAGE PRESCALER

BACKGROUND

A media player may output moving images to a display device. For example, a media player might retrieve locally stored image information or receive a stream of image information from a media server (e.g., a content provider might transmit a stream that includes high-definition image frames to a television, a set-top box, or a digital video recorder through a cable or satellite network). In some cases, the image information is encoded to reduce the amount of data used to represent the image. For example, an image might be divided into smaller image portions, such as macroblocks, so that information encoded with respect to one image portion does not need to be repeated with respect to another image portion (e.g., because neighboring image portions may frequently have similar color and brightness characteristics).

As a result, the media player may decode encoded image information before it is presented via the display device. Moreover, in some cases the media player may also scale one or more image streams before it is presented. For example, a second image stream may be reduced in size and then be overlaid on a first image stream (e.g., to create a picture-within-a-picture effect). The bandwidth and/or processing needed to scale a decoded image stream, however, can make such a feature difficult to implement.

DETAILED DESCRIPTION

Figure 1:
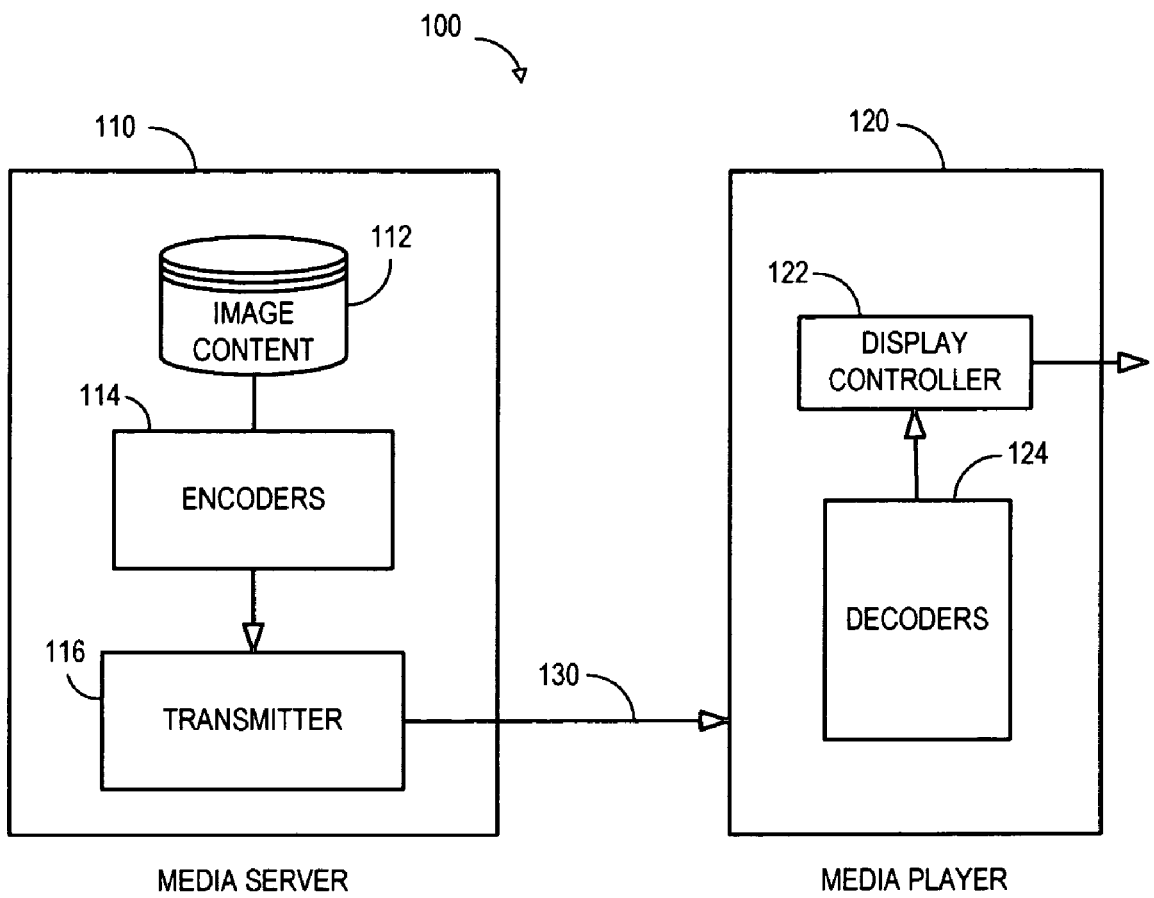
FIG. 1 is a block diagram of a media system.

A media player or similar device may receive image information, decode the information, and output a signal to a display device. For example, a Digital Video Recorder (DVR) might retrieve locally stored image information, or a set-top box might receive a stream of image information from a remote device (e.g., a content provider might transmit a stream that includes high-definition image frames to the set-top box through a cable or satellite network). FIG. 1 is a block diagram of a media system 100 including a media server 110 that provides image information to a remote media player 120 through a communication network 130.

An encoder 114 may reduce the amount of data that is used to represent image content 112 before the data is transmitted by a transmitter 116 as a stream of image information. As used herein, information may be encoded and/or decoded in accordance with any of a number of different protocols. For example, image information may be processed in connection with International Telecommunication Union-Telecommunications Standardization Sector (ITU-T) recommendation H.264 entitled "Advanced Video Coding for Generic Audio-visual Services" (2004) or the International Organization for Standardization (ISO)/International Engineering Consortium (IEC) Motion Picture Experts Group (MPEG) standard entitled "Advanced Video Coding (Part 10)" (2004). As other examples, image information may be processed in accordance with ISO/IEC document number 14496 entitled "MPEG-4 Information Technology—Coding of Audio-Visual Objects" (2001) or the MPEG2 protocol as defined by ISO/IEC document number 13818-1 entitled "Information Technology—Generic Coding of Moving Pictures and Associated Audio Information" (2000).

The media player 120 may decode encoded image information before it is presented via the display device. For example, the media player 120 may include a number of decoders 124 that decode encoded image information. A display controller 122 may receive information from the decoders 124 and select (or combine) the received information before presenting it via the display device.

Figure 2:
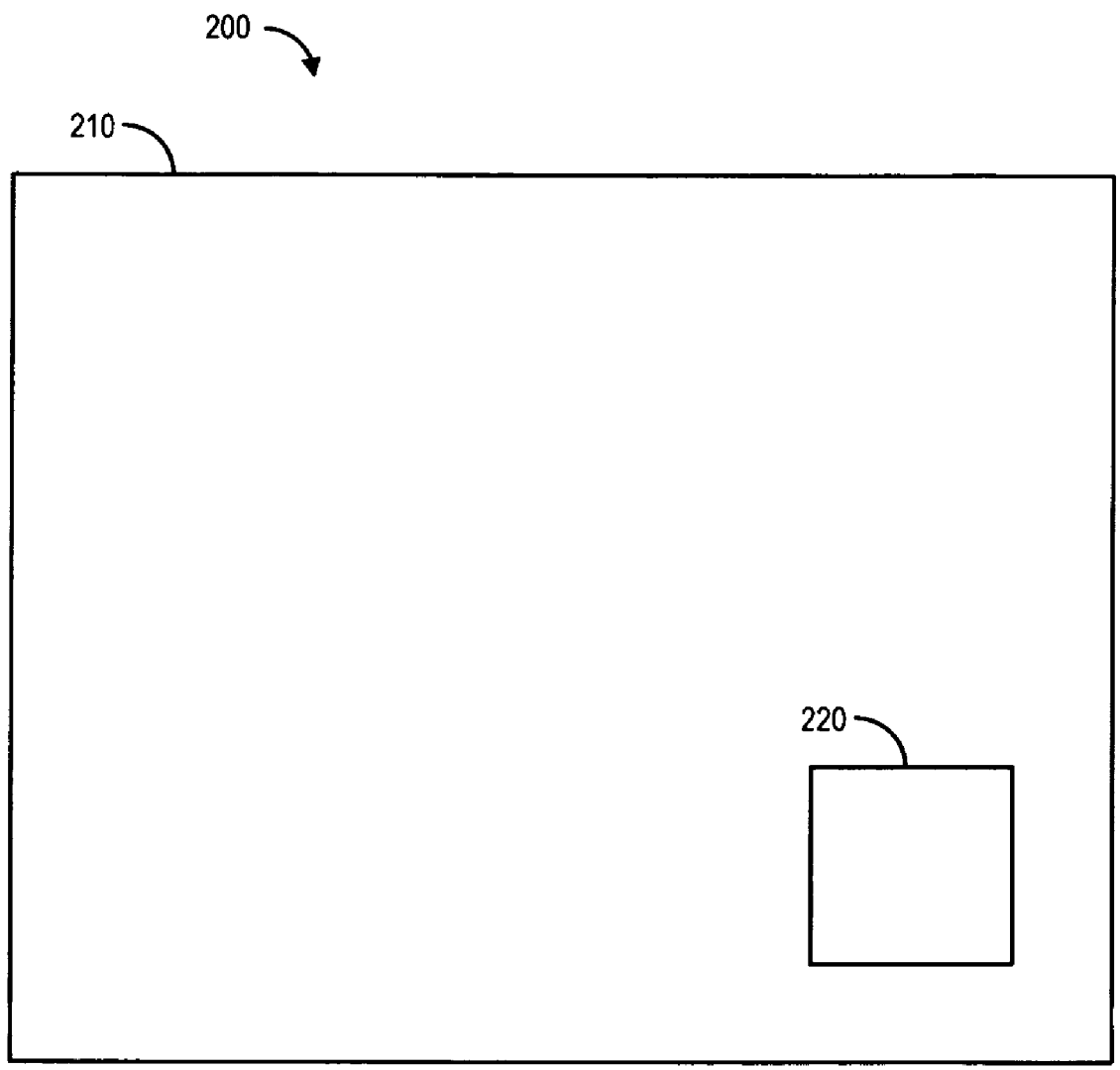
FIG. 2 illustrates a display.

In some cases the media player 120 may also scale one or more image streams before it is presented. For example, FIG. 2 illustrates a display 200 in which a second image stream 220 is reduced in size and then overlaid on a first image stream 210 (e.g., to create a picture-within-a-picture effect).

Figure 3:
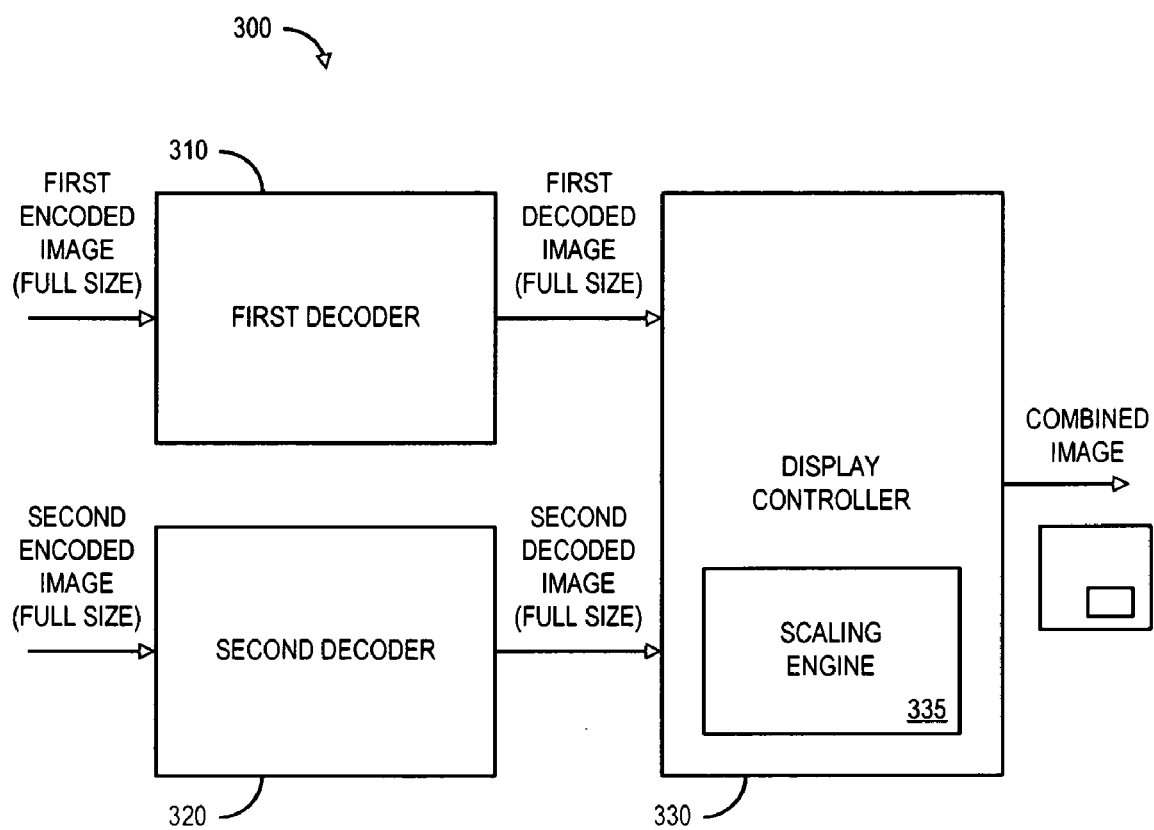
FIG. 3 is a block diagram of a media player.

FIG. 3 is a block diagram of such a media player 300. In particular, a first decoder 310 receives a first encoded image at full size and provides a first decoded image at full size (e.g., pixel data) to a display controller 330. Similarly, a second decoder 320 receives a second encoded image at full size and provides a second decoded image at full size to the display controller 330. The display controller 330 includes a scaling engine 330 that reduces the size of the second image in real time before overlaying the information on the first image (e.g., to generate a display such as the one illustrated in FIG. 2).

Note, however, that in this case the second decoder 320 is transmitting the entire full-sized version of the second image to the display controller 330 (even though the full-sized second image will not be displayed). For example, when a picture-within-a-picture feature is selected by user, the media player 300 may experience a substantial burst of memory traffic (when both full-sized images are being transferred to the display controller 330). As a result, the bandwidth and/or processing needed by the media player 300 to handle this situation can make such a feature difficult to implement.

Figure 4:
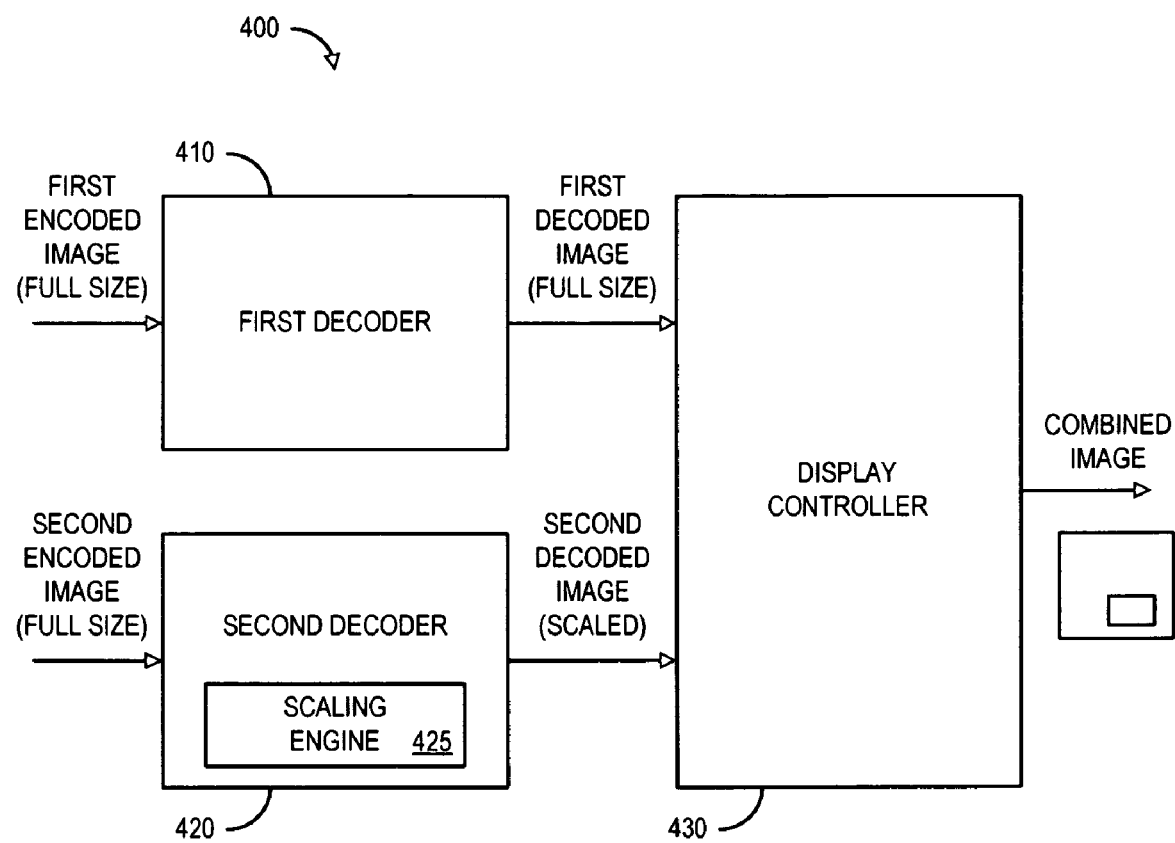
FIG. 4 is a block diagram of an apparatus according to some embodiments.

FIG. 4 is a block diagram of an apparatus 400 according to some embodiments. The apparatus 400 might be associated with, for example, a media player, a television, a Personal Computer (PC), wireless device (e.g., a home media server), a game device, a DVR, and/or a set-top box.

As before, a first decoder 410 receives a first encoded image at full size and provides a first decoded image at full size (e.g., pixel data associated with a moving image) to a display controller 430. Similarly, a second decoder 420 receives a second encoded image at full size. In this case, however, the second decoder 420 includes an integrated scaling engine 425 that reduces the size of the second image before providing the information to the display controller 430. The display controller 430 may then overlay the pre-scaled information on the first image (e.g., to generate a display such as the one illustrated in FIG. 2). Because the scaled version of the second decoded image is provided from the second decoder 420 to the display controller 430 (as opposed to the full-sized version of the second decoded image), the amount of memory traffic experienced in the apparatus 400 may be reduced.

Figure 5:
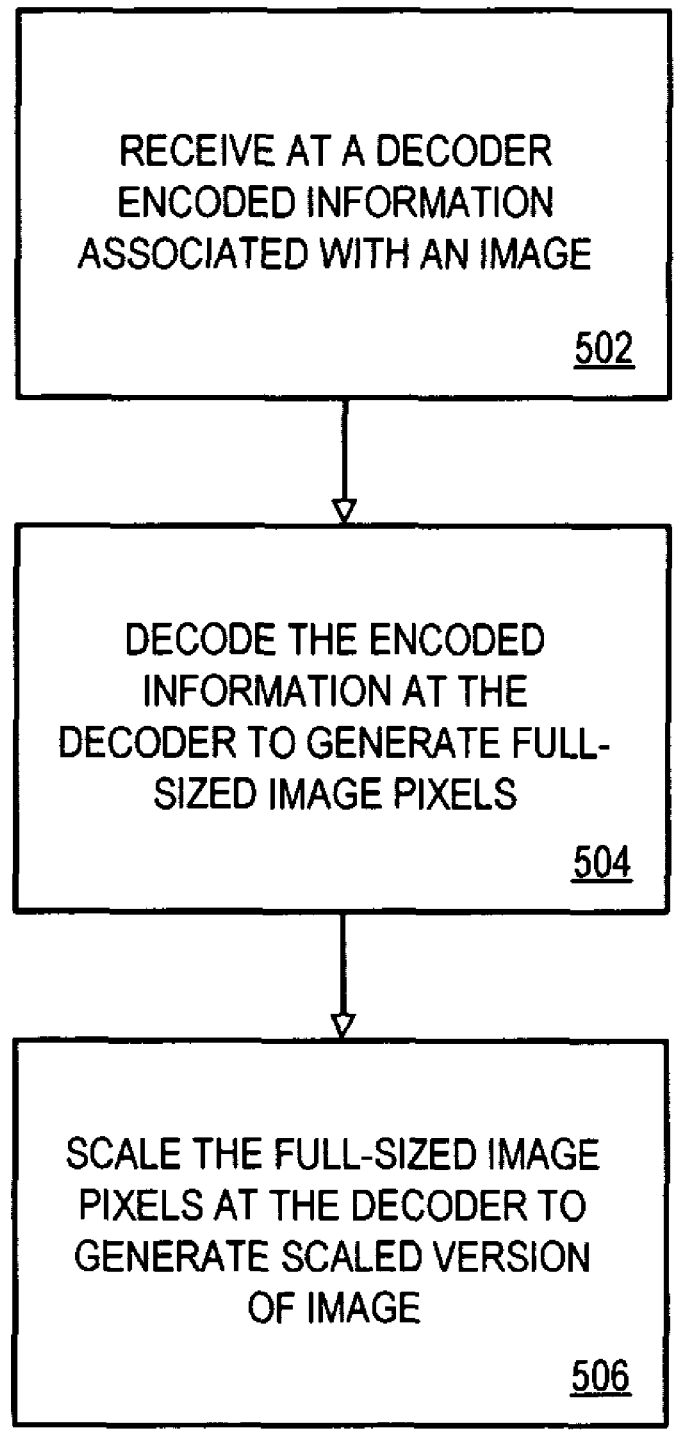
FIG. 5 is a flow diagram illustrating a method according to some embodiments.

FIG. 5 is a flow diagram illustrating a method according to some embodiments. The method may be performed, for example, by the apparatus of FIG. 4. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 502, encoded information associated with a first image is received at a decoder. For example, encoded MPEG information might be received at the decoder (e.g., from a local storage unit or a remote media server).

At 504, the decoder decodes the encoded information to generate full-sized first image pixels representing a full-sized version of the first image. For example, the decoder may decode MPEG information to generate full-sized pixel data associated with the first image. This pixel data might, for example, be stored in a buffer local to the decoder.

At 506, the full-sized pixels are scaled at the decoder to generate scaled first image pixels representing a scaled version of the first image. For example, an integrated pre-scaling device might use a scaling algorithm to generate the scaled first image pixels. These scaled first image pixels might then be transferred to a display controller. In that case, the display controller might combine the scaled first image pixels with full-sized second image pixels representing a full-sized version of a second image (e.g., received by the display controller from another decoder).

Figure 6:
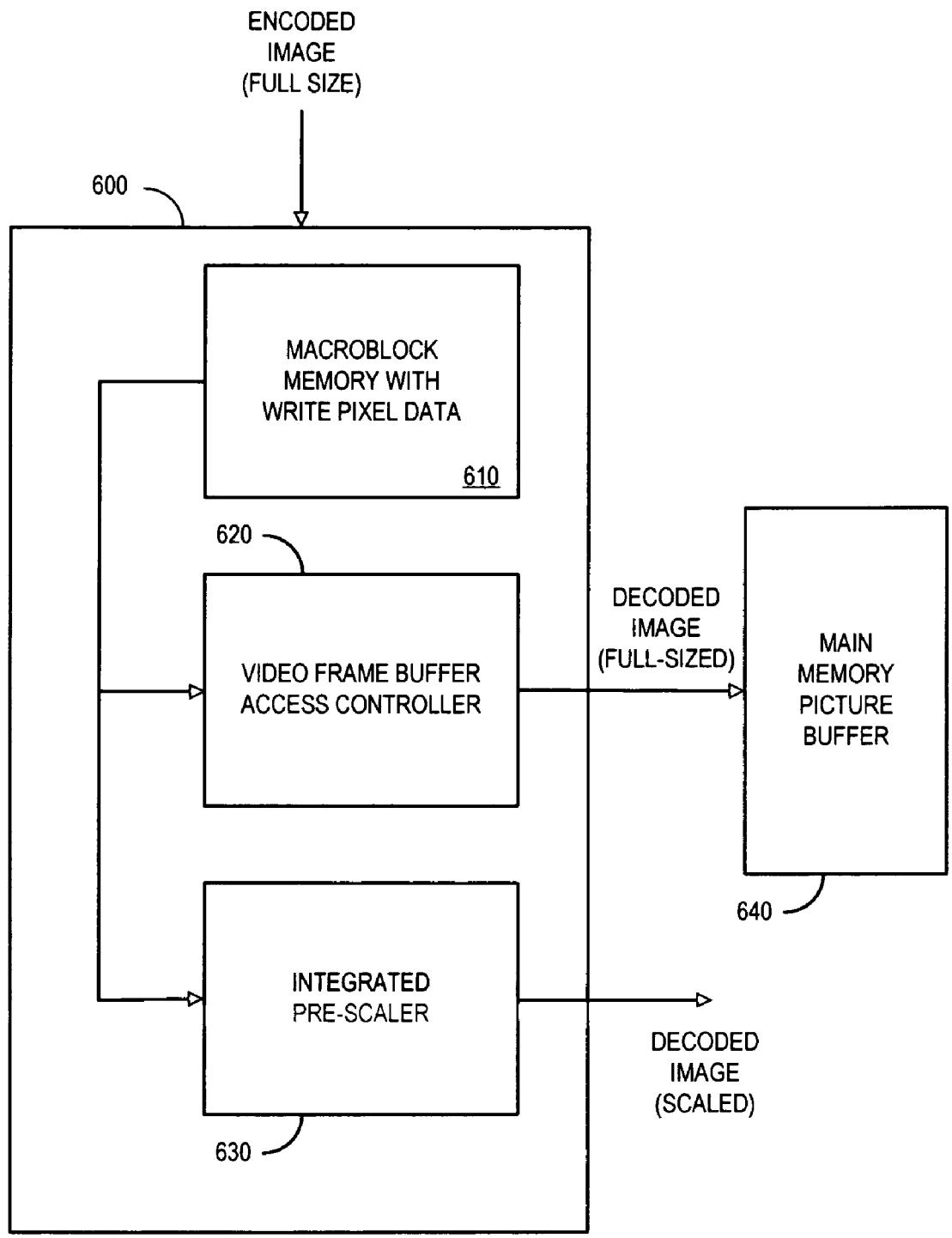
FIG. 6 is a block diagram of a portion of a media player according to some embodiments.

FIG. 6 is a block diagram of a portion of a media player according to some embodiments. In particular, the media player includes a decoder 600 that received encoded information associated with a full-sized version of an image (e.g., a moving picture). The decoder 600 may decode the information and store write pixel data in a local, on-chip macroblock memory 810. If the decoder 600 is to provide a full-sized version of the image, this information can be transferred by a video frame buffer access controller 820 to an external main memory picture buffer 840.

The decoder 600 also includes an integrated pre-scaler 830 that can scale the information in the macroblock memory 810. For example, the pre-scaler may perform scaling on the macroblock data using a filtering algorithm, such as a median filter, a first order two-dimensional interpolator, or a higher order two-dimensional interpolator. According to some embodiments, the filter algorithm scales the macroblocks using a scaling factor of $\frac{1}{2}^n$, where n is an integer greater than zero (e.g., by ½. or ¼). The scaled information may then be provided (e.g., stored in a separate, auxiliary frame buffer).

Figure 7:
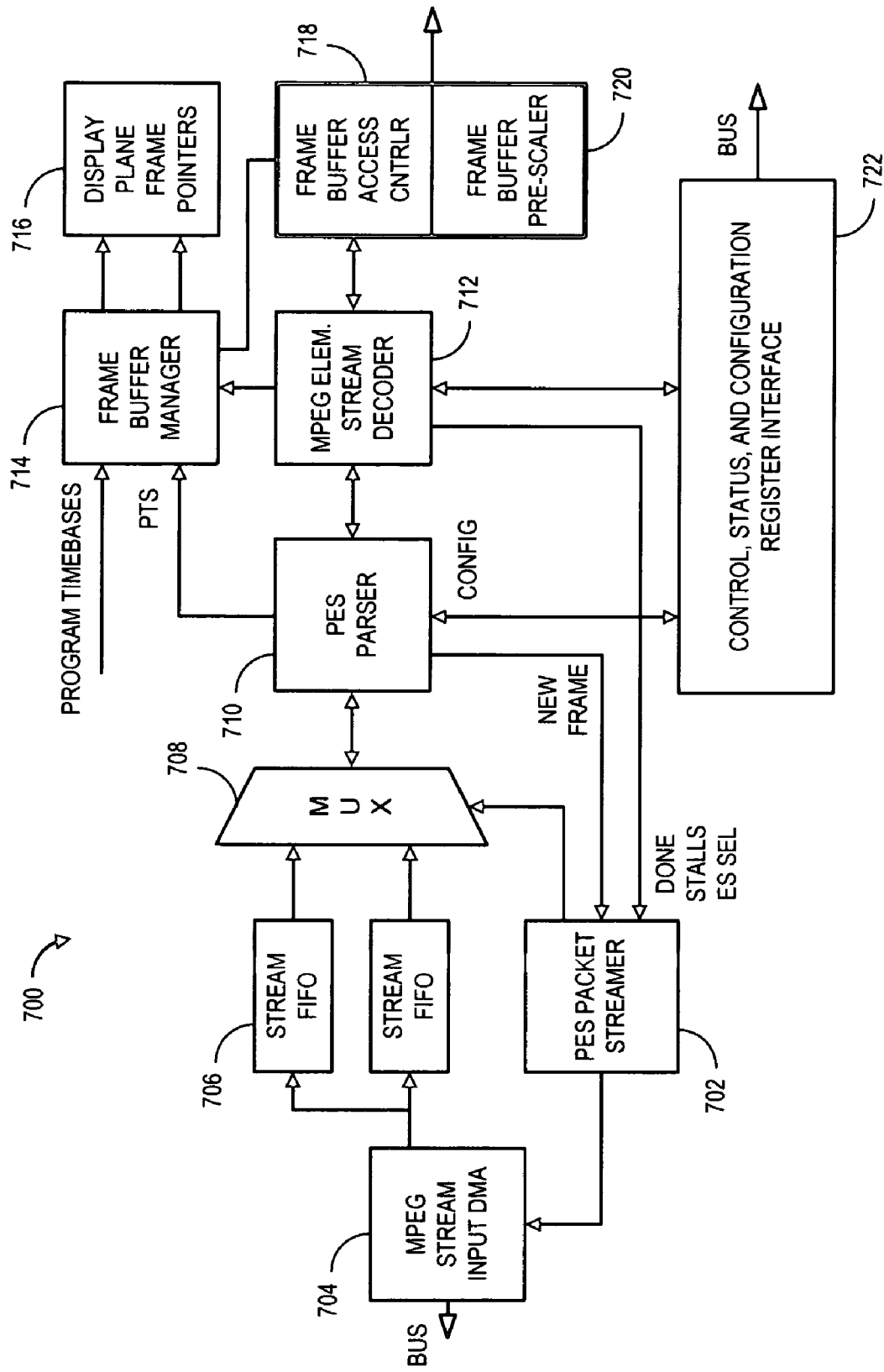
FIG. 7 is a block diagram of a dual-stream decoder according to some embodiments.

FIG. 7 is a block diagram of a dual-stream decoder 700 according to some embodiments. Although an MPEG decoder 700 is used herein as an example, note that embodiments may be associated with any generic video decompression algorithm. The decoder 700 includes a Packet Elementary Stream (PES) packet streamer 702 for two streams of moving image data. The PES packet streamer 702 may, for example, provide information to a pair of stream First-In, First-Out (FIFO) buffers 706 via a MPEG stream input Direct Memory Access (DMA) unit 704. The PES packet streamer 702 may also select information from one of the buffers 706 to be provided to a PES video parser 710 via a multiplexer 708.

The Elementary Stream (ES) may be provided from the parser 710 to a MPEG ES decoder 712. The parser 710 may also provide the Presentation Time Stamp (PTS) to a frame buffer manager 714 (which may also receive program timebases). Note that one frame buffer manager 714 may be provided per stream. Also note that the frame buffer manager 714 may also provide a display buffer address and write signal to a display plane frame pointer 716 (with one pointer being provided per stream). In addition, the parser 710 may provide new frame information to the PES packet streamer 702 and the MPEG ES decoder 712 may provide picture done, stall, and ES select information to the PES packet streamer 702.

The MPEG ES decoder 712 may provide information to a frame buffer access controller 718 (e.g., to be potentially provided via a bus). The frame buffer access controller 718 may, for example, facilitate a transfer of write pixel data from a macroblock memory in the decoder 700 to a picture buffer in main memory (not illustrated in FIG. 7). According to this embodiment, an integrated frame buffer pre-scaler 720 is also provided for the dual-stream decoder 700. The pre-scaler 720 might be controlled, for example, using information from a control, status, and configuration register interface 722. The frame buffer pre-scaler 720 may, for example, receive macroblock information and control information (e.g., configuration information from the register interface 722) and generate pixels associated with a scaled down version of the image. Such an approach may, for example, reduce video traffic near the start of the video processing chain and reduce unnecessary display or compositing memory traffic when high resolution information is not required. As a result, a relatively low cost implementation of a media player or similar device may be provided.

Figure 8:
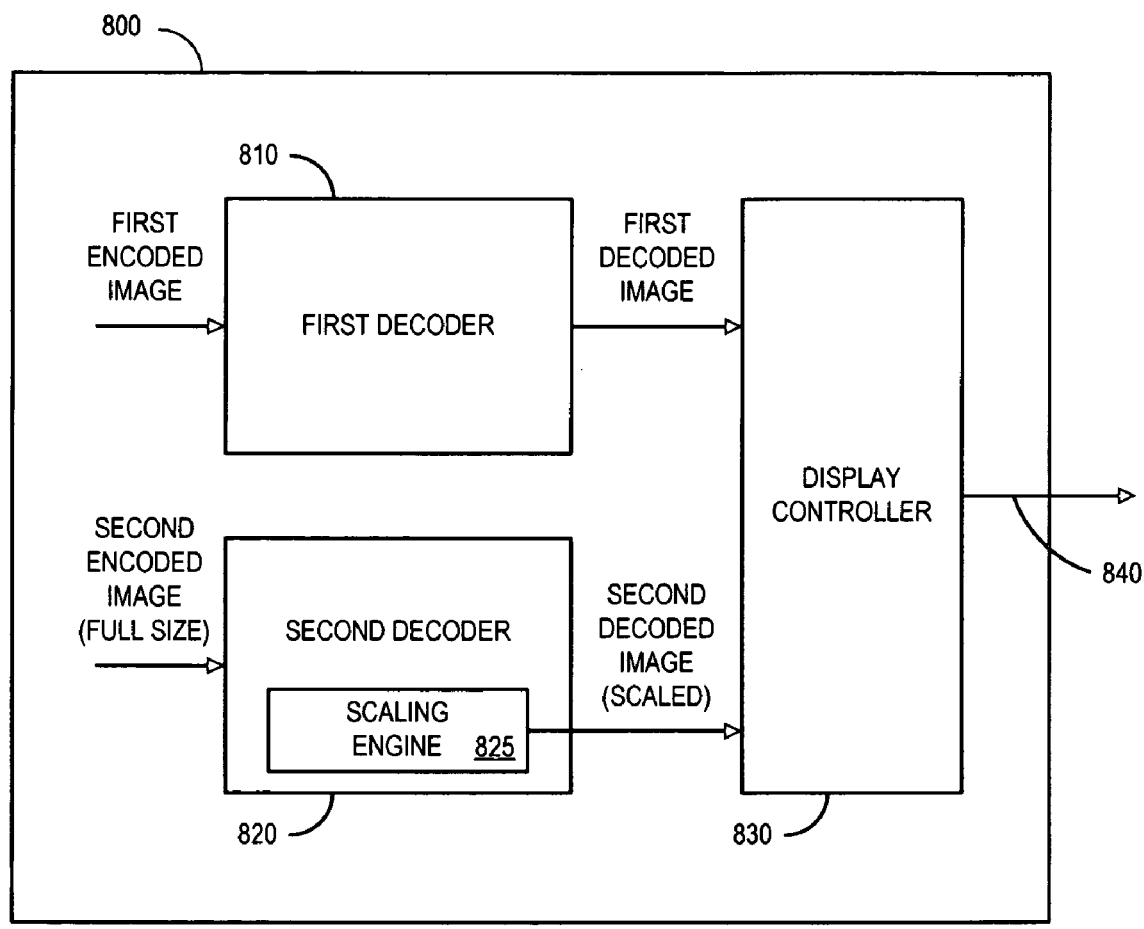
FIG. 8 is a block diagram of a system according to some embodiments.

FIG. 8 is a block diagram of a system 800 according to some embodiments. The system 800 might be associated with, for example, a digital display device, a television such as a High Definition Television (HDTV) unit, a DVR, a game console, a PC or laptop computer, a wireless device, and/or a set-top box (e.g., a cable or satellite decoder). The system may operate in accordance with any of the embodiments described herein. For example, a first decoder 810 may receive a first encoded image at full size and provide a first decoded image at full size (e.g., pixel data associated with a moving image) to a display controller 830. Similarly, a second decoder 820 may receive a second encoded image at full size, and an integrated scaling engine 825 may reduce the size of the second image before providing the information to the display controller 830. The display controller 830 may then overlay the pre-scaled information on the first image (e.g., to generate a display such as the one illustrated in FIG. 2). Because the scaled version of the second decoded image is provided from the second decoder 820 to the display controller 830 (as opposed to the full-sized version of the second decoded image), the amount of memory traffic experienced in the system 800 may be reduced. According to some embodiments, the display controller 830 generates information that is provided to a display device via a digital output 840.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Figure 9:
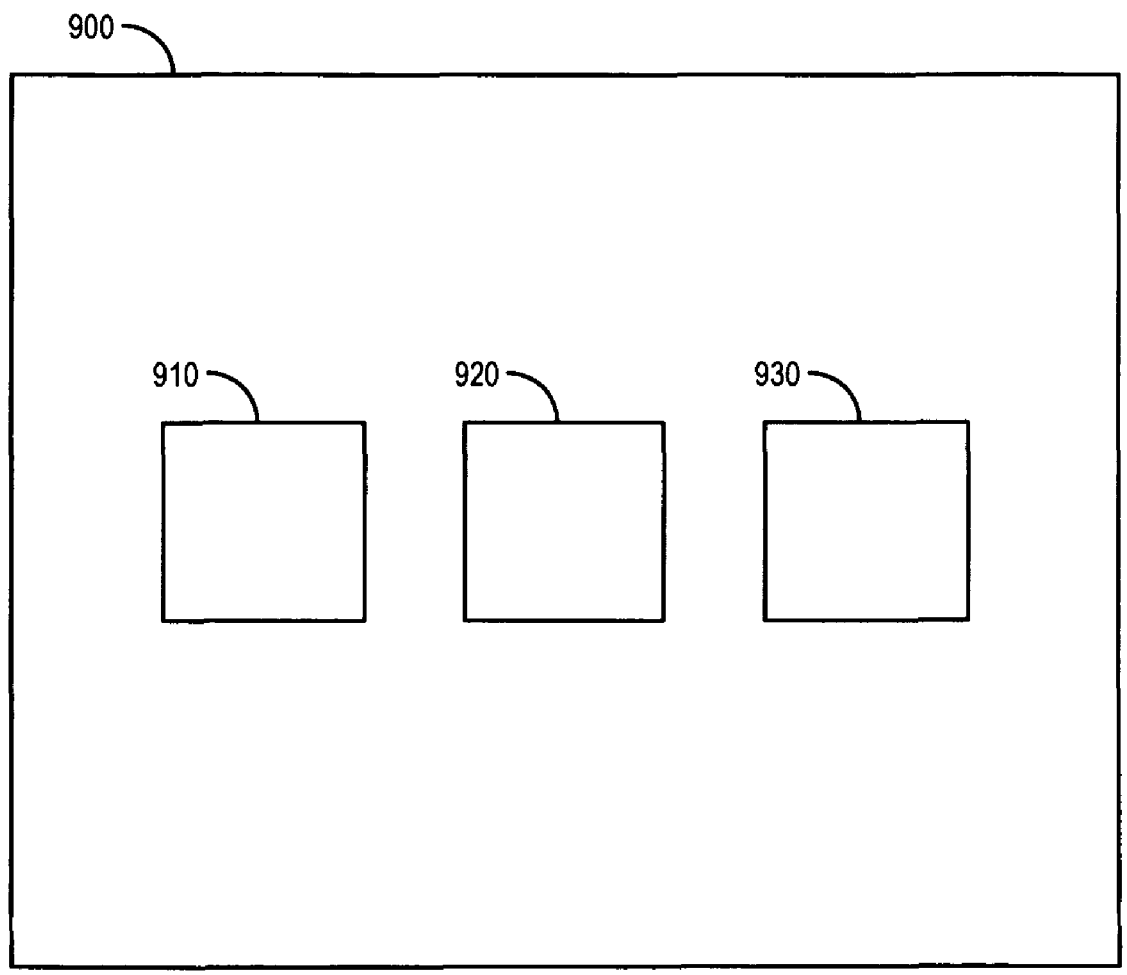
FIG. 9 illustrates a display according to some embodiments.

For example, although generation of a picture-within-a-picture has been described herein, embodiments may be associated with any other types of displays. For example, FIG. 9 illustrates a display 900 according to some embodiments. In this case, the display 900 includes a first scaled image 910, a second scaled image 920, and a third scaled image 930. In this case, multiple decoders may each include a pre-scaler and a display controller may receive scaled version of three different display images. As another example, multiple decoders might share a single pre-decoder according to other embodiments.

Moreover, although particular image processing protocols and networks have been used herein as examples (e.g., MPEG and H.264), embodiments may be used in connection any other type of image processing protocols or networks, such as Digital Terrestrial Television Broadcasting (DTTB) and Community Access Television (CATV) systems.

The several embodiments described herein are solely for the purpose of illustration. Persons skilled in the art will recognize from this description other embodiments may be practiced with modifications and alterations limited only by the claims.

What is claimed is:

1. A method, comprising:
   receiving at a first decoder first encoded information associated with a first image;
   decoding the first encoded information at the first decoder to generate full-sized first image pixels representing a full-sized version of the first image;
   transferring the full-sized first image pixels to a display controller;
   receiving at a second decoder second encoded information associated with a second image;
   decoding the second encoded information at the second decoder;
   using a frame buffer pre-scaler to generate scaled-sized second image pixels representing a scaled-sized version of the second image;
   transferring the scaled second image pixels to the display controller; and
   generating by the display controller a combined image including the full-sized first image pixels and the scaled second image pixels.

2. The method of claim 1, wherein the first image is associated with at least one of: (i) H.264 information, (ii) Motion Picture Experts Group 2 information, or (iii) Motion Picture Experts Group 4 information.

3. The method of claim 1, wherein said receiving is associated with at least one of: (i) a digital display device, (ii) a television, (iii) a digital video recorder, (iv) a game device, (v) a personal computer, (vi) a wireless device, or (vii) a set-top box.

4. An apparatus, comprising:
   a first decoder to receive encoded information associated with a first moving image;
   a second decoder to receive encoded information associated with a second moving image, wherein the second decoder includes an integrated pre-scaler associated with a frame buffer pre-scaler; and
   a display controller to receive information from the first and second decoders.

5. The apparatus of claim 4, wherein the second decoder further includes:
   a macroblock memory, and
   a video frame buffer access controller to decode write pixel data from the macroblock memory.

6. The apparatus of claim 2, wherein the macroblock memory comprises on-chip storage of the second decoder.

7. The apparatus of claim 2, further comprising:
   a main memory picture buffer.

8. The apparatus of claim 2, wherein frame buffer pre-scaler performs scaling on the macroblock data using a filtering algorithm.

9. The apparatus of claim 8, wherein the filter algorithm scales the macroblocks using a scaling factor of $\frac{1}{2}^n$, where n is an integer greater than zero.

10. The apparatus of claim 8, wherein the filtering algorithm is associated with at least one of: (i) a median filter, (ii) a first order two-dimensional interpolator, or (iii) a higher order two-dimensional interpolator.

11. The apparatus of claim 7, wherein said scaling is controlled via a control, status, and configuration register interface.

12. The apparatus of claim 4, wherein said first decoder includes an integrated pre-scaler.

13. The apparatus of claim 4, wherein the first and second decoders are associated with a dual-stream decoder and wherein the first and second decoders share the integrated pre-scaler.

14. A system, comprising:
   a first decoder to receive encoded information associated with a first picture;
   a second decoder to receive encoded information associated with a second picture, including:
      an integrated pre-scaler associated with a frame buffer pre-scaler;
   a display controller to receive information from the first and second decoders and to provide a digital signal; and
   a digital output to provide the digital signal to a digital display device.

15. The system of claim 14, wherein the system is associated with at least one of: (i) the digital display device, (ii) a television, (iii) a digital video recorder, (iv) a game device, (v) a personal computer, (vi) a wireless device, or (vii) a set-top box.

* * * * *